United States Patent [19]
Eck

[11] 4,454,659
[45] Jun. 19, 1984

[54] ADJUSTABLE BAR CARRIAGE FOR AN ALIGNMENT APPARATUS

[75] Inventor: Leonard F. Eck, McPherson, Kans.

[73] Assignee: Kansas Jack, Inc., McPherson, Kans.

[21] Appl. No.: 385,711

[22] Filed: Jun. 7, 1982

[51] Int. Cl.³ ............................................. G01C 15/12
[52] U.S. Cl. ..................................................... 33/288
[58] Field of Search .................. 33/286, 288, 180 AT, 33/181 AT, 174 R, 203.8, 203.2, 203.21; 356/155

[56] References Cited

U.S. PATENT DOCUMENTS

| | | |
|---|---|---|
| 2,575,194 | 11/1951 | Smith ...................................... 33/288 |
| 3,203,103 | 8/1965 | McElfresh et al. . |
| 3,552,024 | 1/1971 | Hunter . |
| 3,869,804 | 3/1975 | Friend ..................................... 33/288 |
| 3,983,635 | 10/1976 | Jarman ................................... 33/288 |
| 4,015,339 | 4/1977 | Harvallius . |
| 4,055,061 | 10/1977 | Bayorgean et al. . |
| 4,098,003 | 7/1978 | Negrin . |

*Primary Examiner*—Harry N. Haroian
*Attorney, Agent, or Firm*—Litman, Day & McMahon

[57] ABSTRACT

An adjustable carriage for mounting a measurement bar to a selected vehicle frame or body having locations corresponding to measurement points utilizes a carriage block sleeved about and slidably embracing the bar and has a clamp to secure the block at a selected location. An adjustable arm is mounted on the carriage block and has a socket affixing connectors which mount the bar from the vehicle. The arm is shiftable angularly to enable connection to the body at the proper points even though the points may be coarsely misaligned or deformed through damage.

5 Claims, 8 Drawing Figures

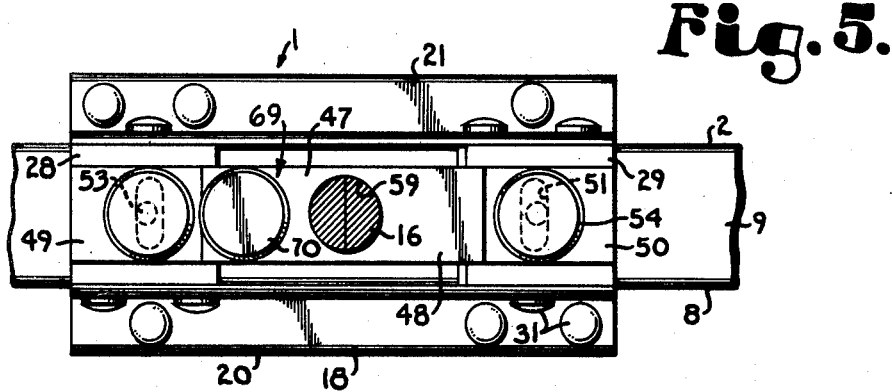
Fig. 5.
Fig. 6.
Fig. 7.
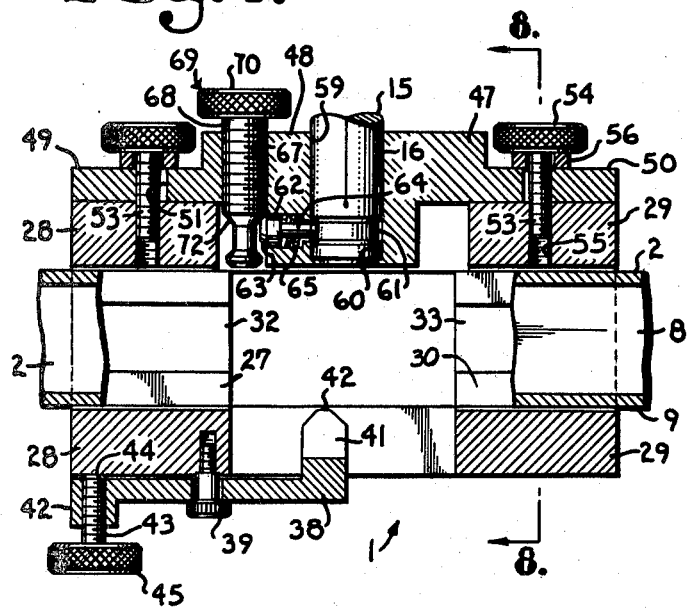
Fig. 8.
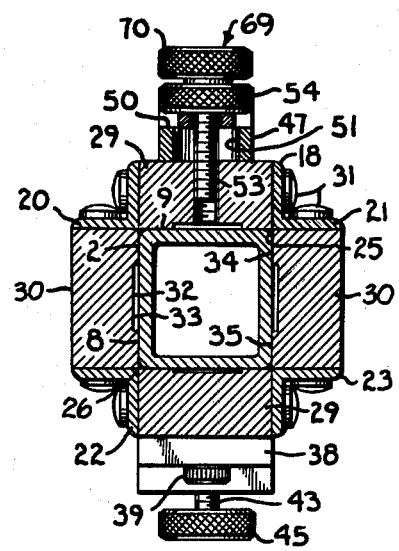

ADJUSTABLE BAR CARRIAGE FOR AN ALIGNMENT APPARATUS

This invention generally relates to a vehicle frame embodying alignment equipment and more particularly, to equipment mounting a carriage bar to a vehicle for purposes of line of sight alignment.

The frame and body of a vehicle is constructed with respect to precise geometric relationships as determined by the manufacturer in order that the vehicle have proper driving and road holding properties as well as accurate exterior design measurement locations. Various apparatuses for effecting straightening of bent and damaged vehicle frame and body parts are known in the art, as are known various guages, rules, and the like for determining the amount of damage to the vehicle frame or body members. These alignment measurement apparatuses are often unduly complex and cumbersome and require long periods of familiarization and usage in order for a vehicle frame and body repair man to become proficient in their operation.

As disclosed in applicant's copending application for U.S. patent application Ser. No. 135,867, now U.S. Pat. No. 4,330,945 applicant's checking and measuring apparatus includes one or more measurement bars having vehicle mounting means adjustably mounted adjacent opposite ends and variously employing either a sighting instrument or a target detachably and adjustably mounted on the measurement bar. Measurement bars are mounted transversely of the vehicle by vehicle mounting means. Selected carriers support the sighting instruments which sight targets 5 mounted on other carriers longitudinally displaced from the first carrier with the sighting instrument thereon. By the use of this apparatus, the operator can accurately and quickly measure differences in alignment of one side of a vehicle relative to the other side or of an upper portion relative to a lower portion.

Carriages have heretofore been used as part of a mounting means to connect the measurement bars to the vehicle. These prior carriages have been sleeved about the measurement bar and include a socket with mounting fingers extending therefrom and connectible to vehicle body and frame measurement points, such as pinch welds and fixture or jig holes. Heretofore, the position of the socket relative to the remainder of the carriage has been set or nonvariable, leading to problems encountered in gross misalignment conditions, such as would occur in cases of serious collision.

In the alignment procedure, disclosed in U.S. patent application Ser. No. 135,867, now U.S. Pat. No. 4,330,945 which is incorporated herein by reference, the measurement bars in one use are positioned beside the vehicle front and rear wheels and suspended from vehicle frame members by the connectors. The bar is translated through the connector carriages to position a bar zero mark at the mid portion of the vehicle and in mutually centered relationship. Measurement scale carriers are connected to the vehicle and preferably placed both in positions where there appears to be no damage or misalignment, thereby using these locations for reference. On at least one of the measurement bars, which may be positioned at either a damaged or a reference position, sighting instruments are mounted by sleeving the instrument carriers over the bar end portions and positioning the sighting instruments at equal distances from the bar mid portion, such as thirty-five inches.

Alignment of the rear end of the vehicle is determined relative to the front end of the vehicle through the use of the measurement bars. Targets are mounted on carriers and translated on the ends of the measurement bars until a line of sight from the sighting instrument impinges upon the center aiming point thereof. The operator then directs his attention to the other side of the vehicle and projects a line of sight toward the generally longitudinally aligned associated target and translates the target along the measurement bar until the line of sight thereof impinges the target center aiming point. The indicia on the measurement bars are noted, for example, 35 left and 35 right, and the distance between the connectors or vehicle mounting means and the targets noted. The distance should be the same on both sides of the vehicle and if not, one side is misshapen relative to the other side. Appropriate corrective measures can then be accomplished to make a pull, push or the like and remove the damage. While the vehicle is undergoing corrective operations, the measurement bars preferably remain attached and the slide carriers can be loosened to accommodate changes in distance as the damage is removed.

When there is gross misalignment from damage, corrective measures such as pulling, pushing or twisting various frame and body portions are made until the measurement points visually appear to the mechanic to be in relative alignment. The measurement bars are mounted as soon as possible whereby the amount of the misalignment can be determined by the apparatus as soon as possible by noting the impingment of the line of sight from the sighting instrument upon a target spaced therefrom. The present invention enables the measurement bar to be suspended from the vehicle frame and body portions relatively soon during the course of damage correction by providing an amount of angular adjustability between the carriage and the measurement bar.

The principal objects of the present invention are: to provide an apparatus for alignment of vehicle frame and body portions; to provide such an apparatus facilitating connection of measurement bars in a transverse relationship to vehicle frame and body portions, said measurement bars respectively carrying targets on end portions thereof for sighting and having sighting instruments on other end portions for projecting a line of sight; to provide such an apparatus providing a degree of flexibility and ease of mounting to grossly misaligned vehicle frame end body portions; and to provide such an apparatus which is relatively inexpensive, sturdy and efficient in use, and particularly well adapted for the intended purpose.

Other objects and advantages of this invention will become apparent from the following description taken in conjunction with the accompanying drawings wherein is set forth, by way of illustration and example, certain embodiments of this invention.

DESCRIPTION OF THE DRAWINGS

FIG. 5 is a top plan view of an adjustable carriage assembly comprising a vehicle mounting means and embodying the present invention.

FIG. 6 is a plan view of the adjustable carriage assembly and showing variable adjustment thereof.

FIG. 7 is a fragmentary, elevational view of the adjustable carriage assembly and showing internal details thereof.

FIG. 8 is a sectional view taken along lines 8—8, FIG. 7.

DESCRIPTION OF THE PREFERRED EMBODIMENT

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
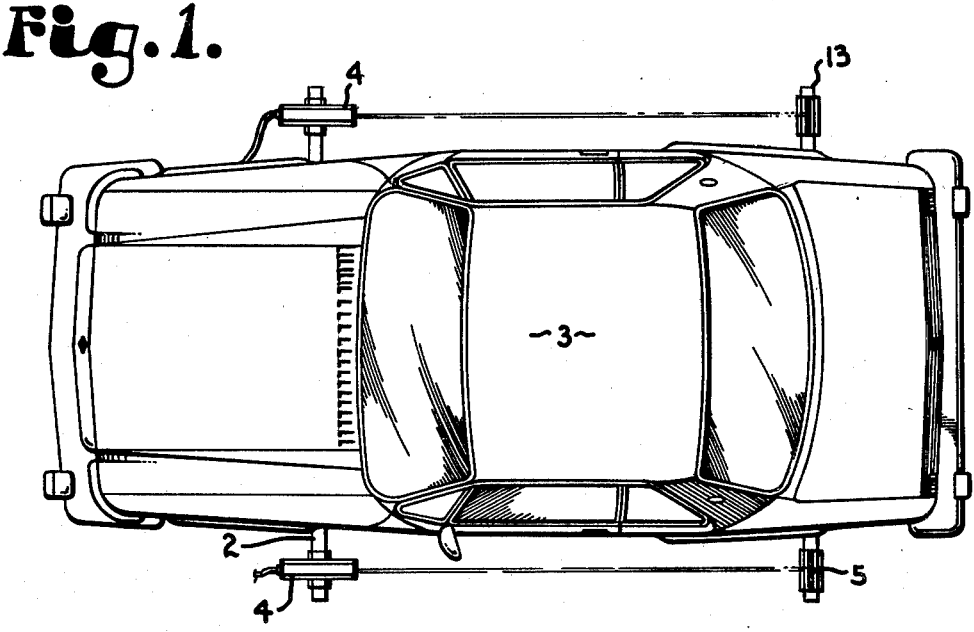
FIG. 1 is a plan view of a vehicle frame and body alignment apparatus shown in connection with a vehicle.
Figure 2:
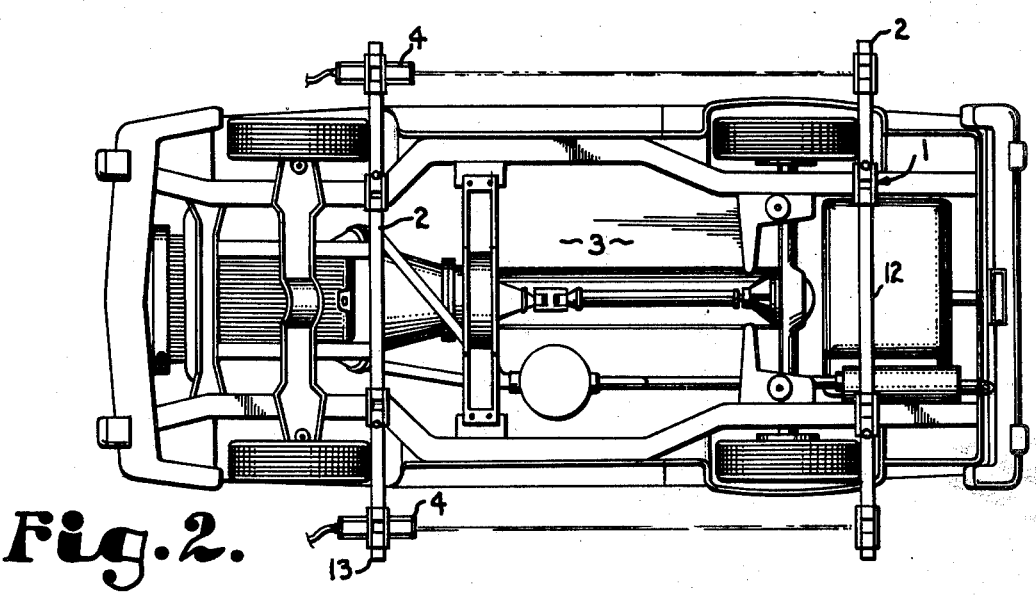
FIG. 2 is a bottom view of the vehicle frame and body alignment apparatus shown in connection with the vehicle and showing the connection of measurement bars to a vehicle.
Figure 3:
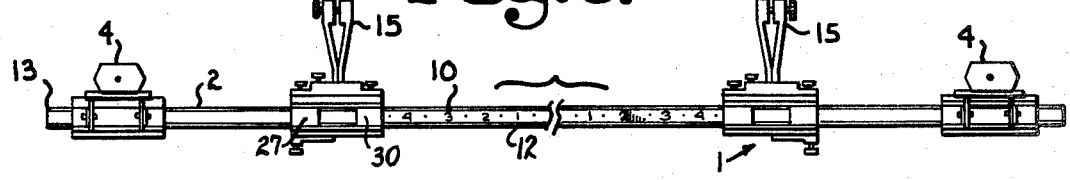
FIG. 3 is an elevational view of a measurement bar and showing vehicle mounting means and sighting instruments positioned thereon.
Figure 4:
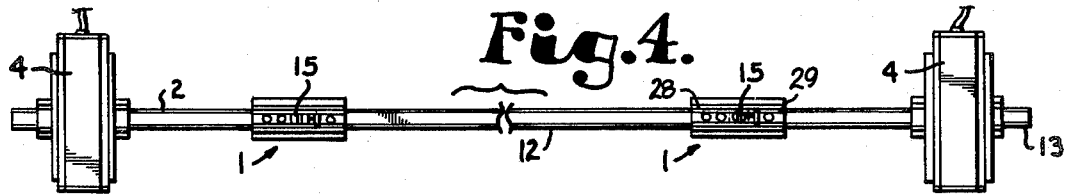
FIG. 4 is a plan view of the measurement bar with the vehicle mounting means and sighting instruments thereon.

Referring to drawings in more detail:

The reference numeral 1, FIGS. 2 through 7, generally indicates an adjustable carriage assembly embodying the present invention. The carriage assembly 1 is for mounting a measurement bar 2 to selected frame and body portions of a vehicle 3 which correspond to jig or measurement points. The measurement bars 2 have the carriage assemblies 1 mounted adjacent opposite ends thereof and variously employ either a sighting instrument 4, such as a laser or a target 5 detachably and adjustably mounted on the measurement bar 2. The measurement bars 2 are mounted transversely on the vehicle 6 by vehicle mounting means including the carriage assembly 1. Use of the apparatus 1 facilitates an operator to connect the measurement bars to the vehicle early in the course of damage correction and then to accurately and quickly measure differences in alignment of one side of the vehicle relative to the other side.

In the illustrated example, FIGS. 5 through 8, the measurement bar 2 is preferably noncircular in cross-sectional shape, such as square tubing having opposite side surfaces 8 and upper and lower surfaces 9. The measurement bar 2 has a scale 10 thereon which has a zero mark at the mid portion 12 of the bar 2 and extends outwardly in both directions to opposite end portions 13 of the bar 2. Preferably, the scale 10 is marked with numerically increasing indicia commencing sequentially at the mid portion 12 so that equal distances on the bar 2 from the mid portion 12 can be readily determined.

The vehicle mounting means detachably and adjustably connect the measurement bar 2 to the vehicle 3 and respectively include the carriage assembly 1 and a vehicle connector 15. Various types of vehicle connectors 15 may be used in conjunction with the carriage assembly 1 for connection to various and different types of vehicle and body portions, such as the fingers shown in FIGS. 3 and 4 for connection to pinch wells or even hooks, screw mounts and the like. Each connector 15 includes a shaft 16, FIG. 7, adapted to fit into the carriage assembly 1.

The carriage assembly 1 includes a sleeve member 18 comprised of angled beams 20 and 21 positioned as an upper pair and angle beams 22 and 23 positioned as a lower pair. The angle beams 20, 21, 22 and 23 are arranged with the respective corners 25 thereof against the corners 26 of the bar 2. Spaced side spacer blocks 27 and 30 form side walls and are respectively positioned between the angle beams 20 and 22 and 21 and 23.

Similarly, spacer blocks 28 and 29 extend between the angle beams 20 and 21 and 22 and 23 and respective top and bottom portions. The blocks 27 and 30 and 28 and 29 are securely positioned and affixed to the beams 20, 21, 22 and 23 by fasteners 31. Each of the blocks 27 and 30 and 28 and 29 includes an inner surface 32 with a central groove 33 and spaced lands 34 and 35, thereby reducing surface area for frictional engagement with the surfaces of the bar 2 and facilitating smooth sliding.

A brake means is mounted to the carriage assembly 1 in order to selectively affix the position of the carriage assembly on a selected scale indicia 10. In the illustrated example, the brake means includes a brake arm 38 swingably mounted on a threaded pin 39 which forms a fulcrum point to move the portion of the brake arm 38 and 39 into and out of braking engagement with the lower surface 9 of the bar 2. The arm 38 has a pawl 41 at one end thereof having an end surface 42 suitably chamfered for swinging engagement. The other end of the brake arm 38 includes a shoulder 42 through which a screw 43 extends and has an end surface 44 abutting against the surface of the underlying block 28. A knurled knob 45 facilitates grasping and rotation of the screw 43 and swinging about the fulcrum pin 39 to urge the pawl 41 into and out of braking engagement with the bar 2.

To allow variable positioning of the vehicle connector 15 to the remainder of the carriage assembly 1 and particularly to the sliding member 18, an adjustment arm 47 is mounted atop the upper, spacer blocks 28 and 29. The arm 47 is substantially the same length as sleeve member 18 and in the illustrated example, is narrower than the width of the spacer blocks 28 and 29. The adjustment arm 47 includes a thickened central portion 48 and opposite thinner steps 49 and 50 with respective bores 51 therethrough. The central portion 48 fits into a central aperture in the sleeve member 18 defined by the gap between the spacer blocks 28 and 29 and the steps 49 and 50 rest upon the spacer blocks 49 and 50 in substantially planar engagement. The bores 51 are in the form of elongate slots and extend transversely to the long axis of the arm 47 and the sleeve member 18 whereby shifting of the alignment of the arm 47 relative to the sleeve member 18 occurs through manipulation. Screws 53 having knurled heads 54 adapted for grasping and manipulation extend through the slotted bores 51 and into bores 54 in the respective upper blocks 28 and 29. Shoulders 56 positioned about the screw 53 and under the head 54 bear against the arm as the screw 53 is tightened and urge the underlying portion of the arm into engagement with the underlying spacer block 28 or 29, thereby preventing movement therebetween.

Centered in the center portion 48 is a downwardly extending socket 59. The socket 59 includes a bottom shoulder 60 for receipt of the shaft 16 of the vehicle connector 15. Preferably, the shaft 16 includes an annular groove 61 and to lock the shaft 16 into the socket 15, the central portion 48 includes a spring loaded locking pawl 62 having a head 63 and a shank 64 sleeved about a coil spring 65. A bore 67, FIG. 7, is situated adjacent the socket 59 and extends into the central portion 48 of the adjustment arm 47. The bore 67 threadably receives the shaft 68 of a locking screw 69 having a knurled head 70. A lower portion of the shaft 68 is circumferentially grooved and includes a wedge surface 72 which engages the chamfered head 63 of the locking pawl 62 and upon tightening of the locking screw 69, urges the end of the shank 64 into and out of locking engagement with the groove 61 located toward the lower end of the vehicle connector shaft 16. Upon loosening of the locking screw 69, the wedge surface 72 backs outwardly from engagement with the chamfered surface of the head 63 and the coil spring 65 urges the head 63 outwardly and disengages the shank 64 from the groove 61.

In the operation of the adjustable carriage assembly 1, the sleeve member 18 is slipped onto the end of a measurement bar 2 and an appropriate vehicle connector 50 is inserted in the socket 59 and loosely secured thereto through rotation of the locking screw 69. It is ultimately desired that the measurement bar 2 be perpendicular to lines of sight beamed from the sighting instruments 4 to the targets 5, however, for purposes of gross alignment, it is desirable to impinge the line of sight on the target 5 as soon as possible. Therefore, the adjustable carriage assembly 1 facilitates gross or coarse alignment by allowing the vehicle connector 15 to be connected to damaged portions of a vehicle and the bar 2 suspended thereby, even when the bar 2 is not perpendicular to the line of sight. The angular adjustability of the adjustment arm 47 relative to the sleeve member 18 permits fastening of the bar 2 by loosening the lock screws 53 at both ends of the arm 47. As damage is removed from the vehicle, such as by exerting pulls or pushes using appropriate force applying apparatus, the point of light beam impingement of the sighting instrument 4 on the target 5 is gradually brought into proper relationship. At this time, the adjustment arm 47 is aligned parallel to the sleeve member 18, such as shown in FIG. 5, and pulls or pushes are again applied to the deformed portions of the vehicle 3 in order to bring the same into fine alignment.

Throughout this procedure, equal displacement of the targets 5 from the mid portion 12 of the bar 2 is checked relative to the displacement of the sighting instrument 4 from the mid portion 12 of the measurement bar 2 by simply noting the indicia of the scale 10. Longitudinal positioning on the measurement bar 2 can be adjusted by loosening the screw 43 as necessary and pulling or pushing on the bar 2.

It is to be understood that while certain forms of the present invention have been illustrated and described herein, it is not to be limited to the specific forms or arrangement of parts described and shown.

What is claimed and desired to secure by Letters Patent is as follows:

1. An adjustable carriage for mounting a measurement bar to selected vehicle frame and body portions corresponding to measurement points and comprising:
   (a) a carriage block sleeved on and slidably embracing said bar;
   (b) said carriage block having clamp means thereon for engagement with said bar and stopping at a selected location;
   (c) an adjustable arm mounted on said carriage block and including means facilitating angular shifting of said arm relative to said carriage block and said bar;
   (d) a socket mounted on said arm and having a connector means extending outwardly therefrom for connection to said frame and body portions.

2. The carriage set forth in claim 1 wherein:
   (a) said carriage block has opposite end portions;
   (b) said arm extends substantially the length of said carriage block and has opposite ends with transverse slots extending therethrough;
   (c) screw fasteners extend through said slots and into said block and selectively nonmovably position said arm against said blocks.

3. The carriage set forth in claim 1 including:
   (a) said connector means includes finger means; and including
   (b) locking means affixing said finger means in said socket;
   (c) said locking means including an extensible pawl protruding into said socket and urged thereinto by a screw having a wedge surface.

4. The carriage set forth in claim 1 wherein:
   (a) said arm has a center portion and opposite step ends of lesser thickness than said center portion;
   (b) said carriage block includes spaced block members defining a center aperture open to said measurement bar;
   (c) said center portion extending into said center aperture.

5. An alignment checking and measuring apparatus for vehicle frame and body portions comprising:
   (a) a plurality of measurement bars each bearing scale indicia and having opposite end portions;
   (b) cooperating mounting means connecting said bars to selected vehicle frame and body portions corresponding to vehicle measurement points and respectively including a carriage sleeved about and slidably embracing said bar and having an arm portion adjustably affixed thereto and variable in angular position relative to said carriage; said arm portion having a socket thereon and a connector extending outwardly from said sockets, said connector including finger means for connection to said vehicle frame and body portions;
   (c) said cooperating mounting means being positioned on said opposite end portions for mounting said measurement bars transversely of the longitudinal axis of said vehicle;
   (d) target means detachably and adjustably mounted on the end portions of a first of said measurement bars and respectively including a target slide member sleeved about a respective bar and translatable thereon and a planar member extended outwardly from a respective target slide member and having target indicia thereon; and
   (e) a laser beam emitting sighting instrument detachably and adjustably mounted on the end portion of a second of said measurement bar for mounting on said vehicle in longitudinally spaced relationship to said first of said measurement bars with said sighting instrument longitudinally spaced from said target means for longitudinally aligning said sighting instrument and said target means by impinging the laser beams of a sighting instrument on a respective target means planar member whereby the point of impingement of said laser beams relative to a respective target indicia may be seen by an operator.

* * * * *